Figure 1:
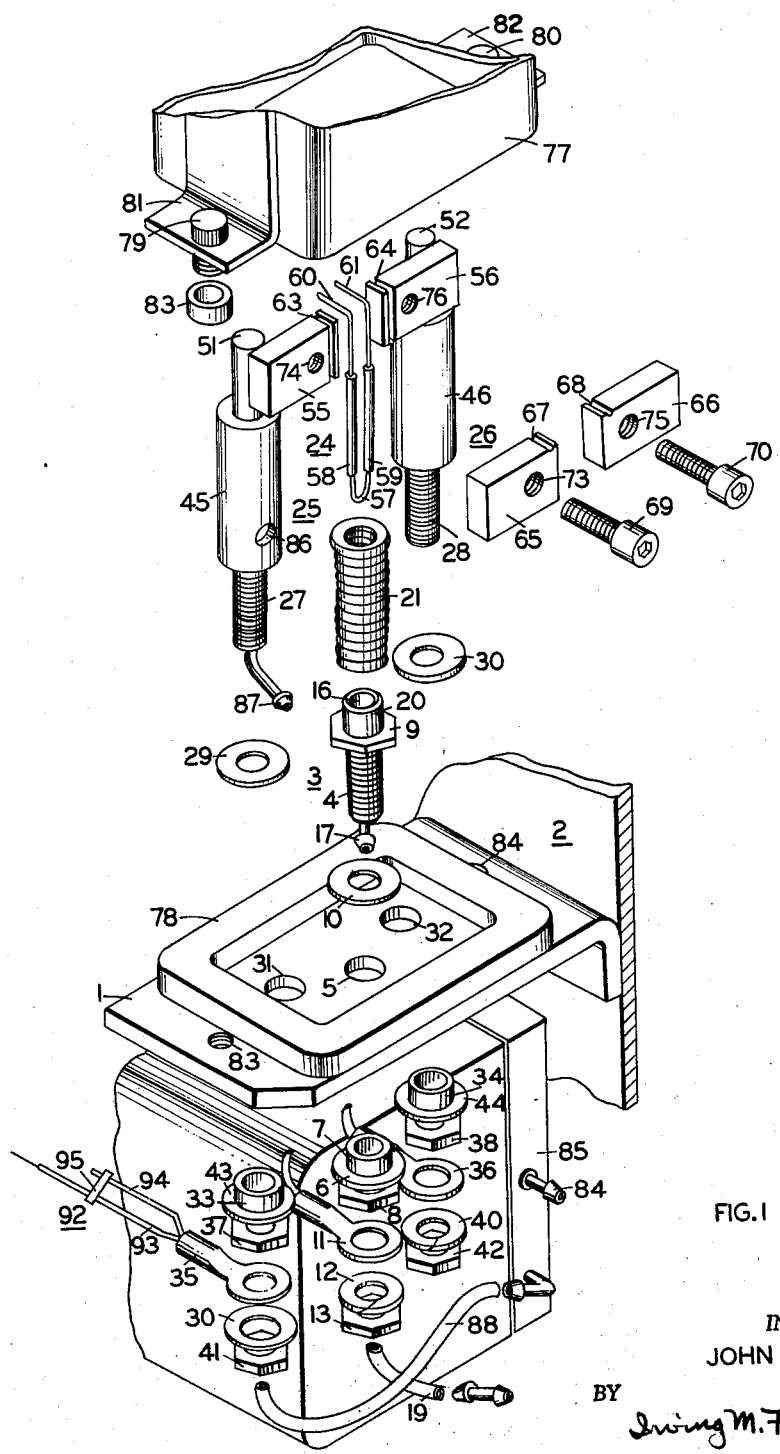

INVENTOR.
JOHN A. ROBERTS
BY Irving M. Freedman
HIS ATTORNEY

United States Patent Office

3,009,074
Patented Nov. 14, 1961

3,009,074
ELECTRICAL VAPOR DETECTOR
John A. Roberts, Lynnfield Center, Mass., assignor to General Electric Company, a corporation of New York
Filed May 1, 1959, Ser. No. 810,476
9 Claims. (Cl. 313—7)

This invention relates to improvements in electrical vapor detectors of the type described in my U.S. Patent 2,795,716 issued June 11, 1957, and assigned to the same assignee as the present invention, for detecting the presence of certain substances or impurities in gases.

The detector disclosed in my aforesaid patent is relatively expensive, includes the use of noble metals such as platinum, and is designed for extremely sensitive equipment used for continuous leak testing as is required, for example, on a production line. For certain applications such as the field servicing of air conditioning and refrigerating equipment or periodic leak testing of pipes, tanks or other enclosures a smaller, more portable, less costly detector is desirable.

It is an object of this invention to provide an improved vapor detector which is simpler to manufacture and less costly than present detectors.

It is another object of this invention to provide an improved vapor detector and associated leak detector equipment which is reduced in size and weight to facilitate a readily portable leak detector.

It is yet another object of this invention to provide an improved vapor detector which is of simplified structure and which may be readily assembled and disassembled for the repair and maintenance thereof.

Further objects and advantages of the invention will become apparent as the following description proceeds and the features of novelty which characterize the invention will be pointed out with particularity in the claims annexed to and forming a part of this specification.

In accordance with one form of the invention, an ion vapor detector is provided having an ion source including a filament with an ion producing semiconductor sleeve and surrounded by a tubular ion collector with the spacing between the turns being adapted to permit the passage of the atmospheric substance being detected. Means are provided to connect a source of voltage between the ion source and the ion collector to cause ion flow between the semiconductor and collector which is related to the amount of substance present to which the detector is sensitive.

More particularly, the filament is in the form of a U-shaped Nichrome V wire supported near the ends and adapted to be heated to approximately 900° C. by current flow therethrough. The ion collector is also made from Nichrome V wire and wound into a tubular form less than ½ inch in diameter. A voltage of approximately 150 volts is applied between the ion source and the collector.

The ion detector is enclosed within a gas-tight housing which functions as part of the gas flow system and which includes a base through which the ion source and collector element support members pass. The support members are electrically conductive to connect the detector elements to the outside of the housing. At least two of the support members are hollow to provide passageways for samples of the atmosphere being tested to pass into and out of the housing.

More particularly, the ion collector support member includes the entrance gas passageway and one of the ion source support members forms the exit gas passageway. The ion source support members include means to removably and adjustably mount the ion source. The mounting comprises two pairs of clamping blocks to secure the ends of the filament.

Figure 2:
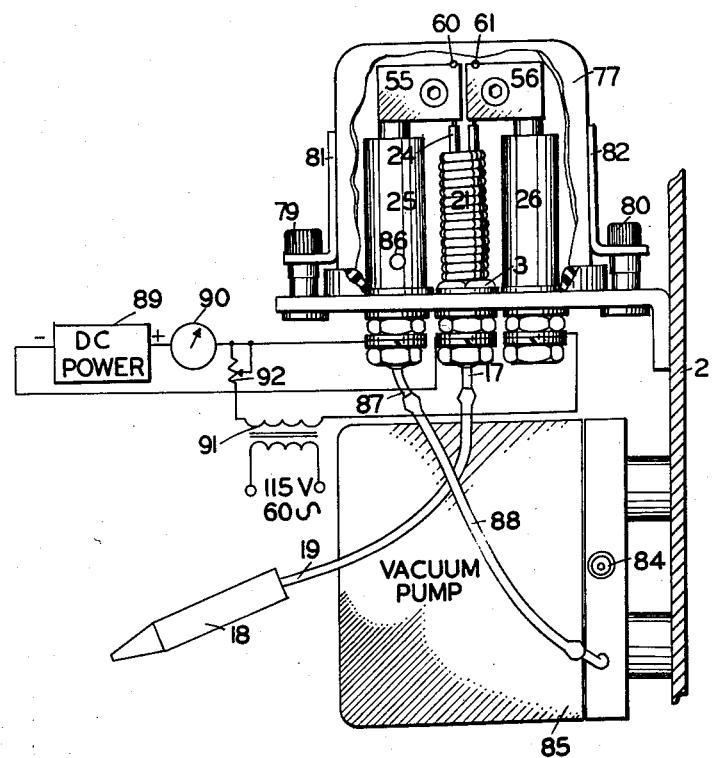

For a better understanding of this invention, reference may be had to the following specification taken in view of the accompanying drawings in which:

FIG. 1 is an expanded perspective view of a vapor detector construction in accordance with the invention; and, FIG. 2 is an elevational view of the assembled detector shown in FIG. 1 with a portion of the cover cut away to show the internal construction, and including a schematic representation of the electrical circuitry associated with the detector.

Referring to the drawings, it is seen that the improved vapor detector includes an aluminum base member 1 rigidly secured to the case 2 associated with the leak detector equipment. The ion collector support member 3 includes a central threaded portion 4 which passes freely through aperature 5 in base 1 and is electrically insulated therefrom by spacer sleeve 7. A flange 9 prevents support member 3 from passing through spacer 6. The flange 9 and nut 8 are separated from the base 1 by insulating washers 6 and 10 position on opposite sides of the base prior to the assembly of the support member 3. Nut 8 secures the ion collector support in the assembled condition by drawing flange 9 snugly against washer 10.

Electrical connection to the support member 3 is made through an electrical lug 11 which surrounds the threaded portion 4 of support 3 in the region below nut 8. Fastening means for the lug comprise lock washer 12 and nut 13.

Ion collector 3, which is constructed of brass, provides electrical connection from lug 11 to the ion collector and includes a central axial aperture 16 which communicates with the gas fitting 17 at the bottom portion thereof. Ion collector support member 3 thus provides both an electrical connection to the collector and a passageway for the gas flow being sampled. The gas flow being sampled is drawn through a probe member 18 from the atmosphere under test and through the connecting tubing 19 to fitting 17. Probe member 18 may be of the type described in my copending patent application, Ser. No. 793,903, filed February 17, 1959, now U.S. Patent 2,996,661, and entitled, Leak Detector Proportioning Probe.

The portion 20 of support member 3 above flange 9 is adapted to fit within and support the ion collector 21. The ion collector 21 in the preferred embodiment is formed by winding a .040 inch diameter nickel-chrome wire sold under the trademark Nichrome V, around a mandrel with a spacing between turns of no more than .003 inch until a tube having a length of 1 inch is formed. Turns further apart may be used but will not direct the gas flow as satisfactorily to the region between the ion source 24 and ion collector 21. The inside diameter of the ion collector 21 is made less than ½ inch with .281 inch being preferable. While a circular cross-section of the ion collector 21 is shown, an oval cross-section has also proved to be satisfactory.

The ion source 24 is supported within the ion collector 21 by electrically conductive ion source support members 25 and 26 which are mounted on base 1 in a manner similar to the ion collector support member 3. Threaded portions 27 and 28 of support members 25 and 26 pass through insulating washers 29 and 30 and apertures 31 and 32, respectively, and are separated from base 1 by insulating spacer sleeves 33 and 34. Insulating spacers 33, 34 and 7 are made of material sold by the E. I du Pont de Nemours & Co. under the trademark Teflon. Nut 37 draws support member 25 downwardly until the lower ridge of central portion 45 bears against insulating washer 29. Similarly, nut 38 draws support member 26 downwardly until the lower ridge of central portion 46 bears against insulating washer 30. Nuts 37 and 38 are insulated from base 1 by insulating washers 43 and 44. It is thus apparent that the ion source support members 25 and 26 are readily secured to but insulated from base 1 while at the same time providing electrical connections through the base. Electrical lugs 35 and 36 are positioned around the threaded portions 27 and 28 and drawn up against nuts 37 and 38 by lock washers 39 and 40 and nuts 41 and 42, respectively.

The upper portions 51 and 52 of ion source support members 25 and 26, respectively, are cylindrical in shape and of a reduced diameter with support blocks 55 and 56 secured thereto in a suitable manner such as by brazing. The support blocks 55 and 56 and the support members above base 1 are constructed of material such as nickel plated brass which is electrically conductive and resistant to the corrosive action of gases which might be encountered during leak detection operation. Support blocks 55 and 56 extend inwardly from ion source support members 25 and 26 with the ends thereof positioned above ion collector 21.

The ion source 24 supported by members 25 and 26 includes a filament 57 of Nichrome V wire, .039 inch in diameter formed in a generally hairpin or U shape. The ion source material comprises ceramic tubes or sleeves 58 and 59, 29/32 inch long, slid over the ends of the filament 57 to the legs thereof. The sleeves 58 and 59 should contain alkaline earth impurities for increased ion emission and may be of steatite or alumina ceramic such as is commonly used in thermocouple tubing. One type of steatite ceramic which has proved satisfactory is that manufactured and sold by the Stupakoff Ceramic Div. of the Carborundum Co., Latrobe, Pennsylvania, as thermocouple tubing. The chemical composition of such tubing is believed to be chiefly $MgO \cdot SiO_2$ with alkaline earth impurities and a binder. The sleeves 58 and 59 have inside diameters of 1.0 millimeter and outside diameters of 1.75 millimeters. For efficient ion emission it has been found that the sleeves should fit relatively snugly on the filament and should be of a thickness which will enable ion conductivity and yet will include sufficient ion emitting material.

After the assembly of the sleeves 58 and 59, the ends 60 and 61 of the filament 57 are bent at substantially right angles to the legs of the filament in order to facilitate the clamping of the filament by support blocks 55 and 56. The bend has a radius of .020 inch and leaves the filament legs with a length of 17/16 inches. The distance between the legs of the filament 57 in the region of the bends is 1/8 inch. Grooves 63 and 64 are formed along the edges of one side and the top of blocks 55 and 56, respectively, to receive the filament 57.

Blocks 65 and 66 include grooves 67 and 68 which cooperate with portions of grooves 63 and 64, respectively, to provide an aperture for clamping the portions of filament 57 above the sleeves 58 and 59. The support blocks 65 and 66 are removably secured to blocks 55 and 56, respectively, by screws 69 and 70. Screw 69 passes through threaded aperture 73 of block 65 into threaded aperture 74 of block 55 while screw 70 passes through threaded aperture 75 of block 66 into threaded aperture 76 of block 56. The filament 57 may, therefore, be removably clamped in position and adjusted between the cooperating blocks 55, 65 and 56, 66 to insure good electrical connection and proper positioning within the central region of ion collector 21.

The vapor detector including ion source 24 and ion collector 21 is enclosed within a gas-tight housing through the cooperation of base 1 with cover 77 which surrounds the vapor detector. A neoprene gasket 78 is cemented to base 1 around the support members 3, 25 and 26. The cover 77 seats upon the gasket 78 to insure a gas-tight fit and is secured in position by screws 79 and 80 which pass through brackets 81 and 82 secured to opposite sides of cover 77 into threaded apertures 83 and 84 of base 1.

In order to provide the necessary vacuum to draw samples of the atmosphere from a region suspected of leakage, vacuum pump 85 is positioned within case 2 in the region below the vapor detector. The vacuum provided by pump 85 draws samples of the atmosphere through probe member 18, connecting tubing 19, and into the vapor detector through the ion collector 21. The atmosphere is then drawn out from the interior of cover 77 by the vacuum pump through a passageway in the lower portion of support member 25. The passageway extends from a radial aperture 86 of member 25 within cover 77 axially through the central region of threaded portion 27 to gas fitting 87 positioned below base 1. The gas flow path is completed by tubing 88 connecting fitting 87 to vacuum pump 85 which exhausts at aperture 84. Support members 3, 25 and 26 along with their associated spacers and washer arrangements provide gas-tight connections with apertures 5, 31 and 32, respectively, to prevent unwanted in-leakage through base 1. Washers 10, 29 and 30 are coated with a high temperature silicone varnish to seal them against leakage. The arrangement is later baked and nuts 8, 37, 38, 13, 41 and 42 retightened.

The electrical connection and associated equipment for incorporating the vapor detector in a leak detector system are shown schematically in FIG. 2. Referring to FIG. 2, it will be seen that D.C. or direct current power supply 89 in series with an indicator device such as an electrical instrument 90 are connected between one side of the filament 57 and the ion collector 21 through support members 25 and 3, respectively. The D.C. power supply 89 is connected with a polarity such that the ion collector 21 is negative with respect to filament 57. The voltage output of D.C. power supply 89 should be in the range of 40 to 500 volts, with 150 volts being preferable. Filament power may conveniently be supplied from the 115 volts, 60 cycle line through step-down transformer 91 to apply approximately 1.2 volts across the ends 60 and 61 of filament 57.

Since the magnitude of current flow through filament 57 affects the operating characteristics of the vapor detector, an adjustable resistor 92 is inserted in series with the filament supply. The construction details of a convenient form of adjustable resistor are shown in FIG. 1.

Referring to FIG. 1, adjustable resistor 92 comprises a pair of parallel Nichrome V wires 93 and 94 connected at one end to electrical lug 35 and having an electrically conductive adjustable bridging member or slider 95 spaced from the lug to vary the resistance between the slider and the lug. Electrical connection from the filament transformer 91 is made to the slider 95.

Current flow through filament 57 heats the filament to a temperature in the range of 600–1200° C. with an operating temperature of approximately 900° C. being preferable. Since ion collector 21 is negative with respect to filament 57, ion emission from sleeve members 58 and 59 causes a flow of positive ions between the ion source 24 and the ion collector. It is not necessary to separately heat the ion collector 21 as is required for certain prior art ion producing arrangements. It should be noted that the arrangement described requires no noble metals such as platinum.

In a manner well known in the art, and as described in my aforesaid patent application, leaks are detected by probing the regions suspected of leakage with probe 18 to detect the presence of tracer gases to which the leak detector system is sensitive. Samples of the region probed are drawn by vacuum pump 85 through the region between ion source 24 and ion collector 21 via a path described above. Certain gases or vapors, particularly those containing a member of the halogen family, will increase the degree of ionization when introduced in the region between the ion collector 21 and ion source 24 and produce an avalanche of positive ions from source 24 which is collected by collector 21. The increased ion flow is reflected in an increased current flow in the external electrical circuit including the D.C. power supply 89 and electric instrument 90 with the electric instrument showing an increased current flow as an indication of the presence of the tracer gas and of a leak.

While filament 57 is shown in the form of a U-shaped member, it should be appreciated that the filament could take other configurations such as a spiral or a straight wire. The U-shaped configuration is preferable since it is relatively uncomplex, provides efficient ion emission area, and readily enables the filament 57 to expand when heated without undue deformation.

While particular embodiments of the invention have been illustrated and/or described, various changes and modifications therein may be made by one skilled in the art without departing from the spirit and scope of the invention as set forth in the appended claims.

What I claim as new and desire to secure by Letters Patent of the United States is:

1. A detector for a finely divided atmospheric substance comprising an ion source and an ion collector, said ion source including a filament adapted to be heated by current flow therethrough, and an ion producing semiconductor sleeve member surrounding said filament, the internal dimensions of said sleeve relative to said filament enabling said sleeve to be slid over said filament, said semiconductor sleeve member fitting snugly about said filament, said ion collector surrounding and spaced from said ion source, said spacing being adapted to guide the flow of said atmospheric substance therethrough, said sleeve member surrounding only a portion of said filament in the region between said filament and said ion collector, and means adapted to connect a source of voltage between said ion source and said ion collector to cause ion flow in the space between said semiconductor member and said ion collector.

2. A detector for a finely divided atmospheric substance comprising an ion source and a tubular ion collector, said ion source including a filament adapted to be heated by current flow therethrough, and an ion producing semiconductor sleeve member surrounding said filament, said ion collector surrounding and spaced from said ion source, said collector comprising closely spaced turns of wire adapted to guide the flow of said atmospheric substance axially therethrough, and means adapted to connect a source of voltage between said ion source and said ion colector to cause ion flow between said semiconductor member and said ion collector.

3. A detector as in claim 2, wherein said filament is formed of Nichrome wire, said collector is formed of Nichrome wire and said tubular form has a diameter of less than one-half inch.

4. A detector for a finely divided atmospheric substance comprising an ion source and an ion collector, said ion source including a U-shaped filament adapted to be heated by current flow therethrough, and an ion producing semiconductor sleeve member surrounding at least one leg of said filament, said ion collector surrounding and spaced from said ion source, said spacing being adapted to permit the passage of said atmospheric substance therethrough, and means adapted to connect a source of voltage between said ion source and said ion collector to cause ion flow between said semiconductor and said ion collector.

5. A detector for a finely divided atmospheric substance comprising an ion source and a surrounding tubular ion collector, said ion source including a U-shaped filament supported at the ends thereof and adapted to be heated by current flow therethrough, and an ion producing member surrounding the legs of said filament, said ion collector being less than one-half inch in diameter and spaced from said ion source, said spacing being adapted to permit the passage of said atmospheric substance therethrough, and means adapted to connect a source of voltage between said ion source and said ion collector to cause ion flow therebetween.

6. A detector for a finely divided atmospheric substance comprising an ion source and a surrounding tubular ion collector, said ion source including a U-shaped Nichrome filament supported at the ends thereof and adapted to be heated by current flow therethrough, and an ion producing semiconductor member including alkaline earth material and surrounding the legs of said filament, said ion collector being less than one-half inch in diameter and spaced from said ion source, said spacing being adapted to permit the passage of said atmospheric substance therethrough, and means adapted to connect a source of voltage between said ion source and said ion collector to cause ion flow between said semiconductor and said collector.

7. A detector for a finely divided atmospheric substance comprising an ion source and an ion collector supported within a gas-tight housing by support members, said ion source including a filament adapted to be heated by current flow therethrough, said ion collector being spaced from said ion source to permit the passage of said atmospheric substance therebetween, said support members extending from ends outside said housing to said filament and ion collector respectively and providing electrical connection therebetween, two of said support members having a hollow portion thereof to provide passageways for said atmosphere from said ends to a region within said housing, one of said passageways being in the member supporting said collector, and the other of said passageways extending between the interior of said housing and the exterior thereof said filament being U-shaped and supported near the ends thereof by said support members.

8. A detector for a finely divided atmospheric substance comprising an ion source and an ion collector supported within a gas-tight housing by support members, said ion source including a filament adapted to be heated by current flow therethrough, said ion collector being spaced from said ion source to permit the passage of said atmospheric substance therebetween, said support members extending from ends outside said housing to said filament and ion collector respectively and providing electrical connection therebetween, at least two of said support members having a hollow portion to provide a through passageway for said atmosphere from said ends to a region within said housing, said support members including means to adjustably mount said ion source, said adjustable mounting including two pairs of clamping members for clamping the ends of said filament therebetween.

9. A detector for a finely divided atmospheric substance comprising an ion source and an ion collector, said ion source including a curvilinear filament adapted to be heated by current flow therethrough, and a plurality of separated ion producing sleeve members closely covering said filament, said separated sleeve members providing uncovered surfaces of said filament therebetween, said ion collector surrounding and spaced from said ion source, said spacing being adapted to permit the passage of said atmospheric substance therethrough, and means adapted to connect a source of voltage between said ion source and said ion collector to cause ion flow in the space between said semiconductor member and said ion collector.

References Cited in the file of this patent

UNITED STATES PATENTS

| | | |
|---|---|---|
| 2,232,030 | Kallmann | Feb. 18, 1941 |
| 2,550,498 | Rice | Apr. 24, 1951 |
| 2,573,005 | Glyptis | Oct. 30, 1951 |
| 2,591,485 | White | Apr. 1, 1952 |
| 2,814,018 | Zemany | Nov. 19, 1957 |
| 2,897,437 | Briggs et al. | July 28, 1959 |